UNITED STATES PATENT OFFICE.

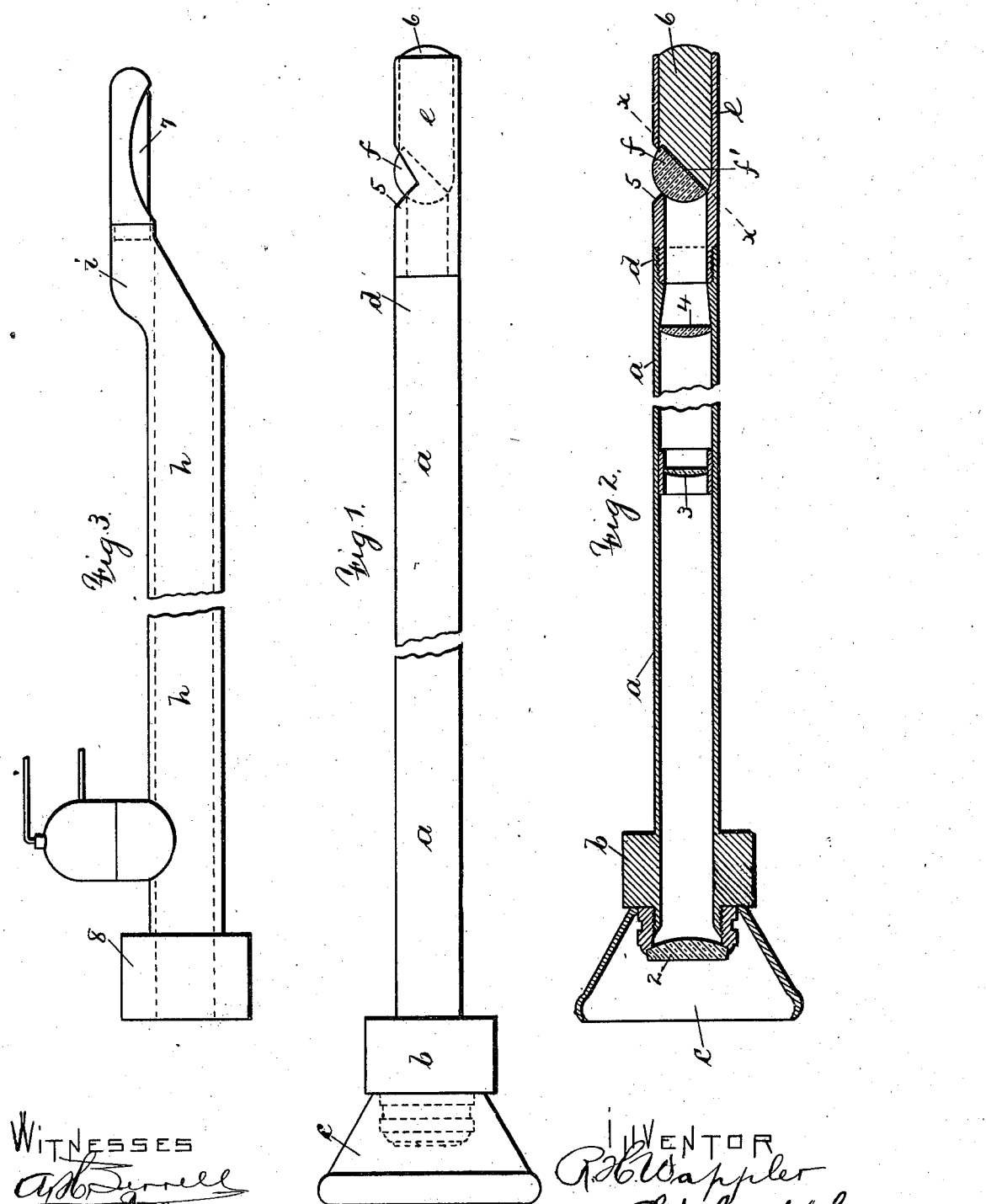

REINHOLD H. WAPPLER, OF NEW YORK, N. Y.

ENDOSCOPE OR OTHER OPTICAL INSTRUMENT.

SPECIFICATION forming part of Letters Patent No. 723,790, dated March 24, 1903.

Application filed May 17, 1902. Serial No. 107,721. (No model.)

*To all whom it may concern:*

Be it known that I, REINHOLD H. WAPPLER, a citizen of the United States, residing in the borough of Manhattan, city, county, and State of New York, have invented an Improvement in Endoscopes or other Optical Instruments, of which the following is a specification.

My invention relates to an improvement in optical instruments, and is particularly adapted for use in connection with electrosurgical instruments employed in the examination for and detection of diseases of a gastric or urinary nature. Heretofore in instruments of this kind the extent of vision has been very limited—as, for instance, it has been necessary to employ separate and distinct instruments for examining the upper, lower, and side walls of an organ; and the object of my invention is the production of an instrument whose limit of vision is not so restricted, and hence with which alone practically all the interior walls of an organ may be examined, even to the walls of the orifice thereof.

In carrying out my improvements I employ a suitable telescopic tube fitted with the necessary lenses to magnify and carry the image, the telescopic tube having a suitable end eyepiece and being provided at the opposite end with a removable end piece. In this is mounted a hemispherical lens set at an angle of forty-five degrees with the axial line of the telescopic tube, the flat back of the lens being silvered or otherwise suitably coated to obtain the necessary reflecting property, and the said end piece is provided with an opening so as to allow an angle of forty-five degrees approximately for both the angles of incidence and reflection.

The instrument is adapted to be employed in connection with an electrosurgical instrument having an electric light in an offset position at one end, as shown and described in my application, Serial No. 63,842, filed June 10, 1901, for electrosurgical instruments, and to be passed into the same as a sheath, which latter instruments are adapted to be inserted into the organs of the human body to be examined.

In the drawings, Figure 1 is an elevation of my improved optical instrument. Fig. 2 is a central longitudinal section through the same, and Fig. 3 is a general elevation of the electrosurgical instrument with which the optical instrument is adapted to be employed.

$a$ represents a telescopic tube provided with the lenses 2, 3, and 4 to magnify and carry the image, and the tube $a$ is provided with a head end $b$ and an eyepiece $c$, secured thereto in any desired manner. The opening in the end $d$ of the telescopic tube $a$ is of a decreased diameter and is interiorly threaded.

$e$ represents a metallic tubular end piece having a reduced threaded end adapted to screw into the end $d$ of the telescopic tube $a$. The tube is bored out from the other end to a seat represented by the dotted line $x\,x$, and the forward end is of larger diameter. The end piece is provided with a V-shaped opening 5 and with a metal part 6, fitting therein, with its outer end sealed in any desired manner and its inner end cut at an angle of forty-five degrees, and a hemispherical lens $f$ is set by cement at its points of contact and in the end piece $e$ to the angular end of the part 6, adjacent to the opening 5, in such a position that the same contacts with and may be cemented at the seat-line $x\,x$. The angle between the flat face of the hemispherical lens $f$ and the axial line of the telescopic tube is approximately an angle of forty-five degrees.

The flat face of the hemispherical lens $f$ is to be silvered or covered with a suitable substance $f'$ to make the lens reflective, and the said lens $f$ is so set that the joint between the same and the metal tube $e$ is water-tight and that the angle of incidence is approximately equal to the angle of reflection, both being about forty-five degrees. Any suitable cement material that may be employed will cause the joints to be water-tight.

The instrument as hereinbefore described is particularly adapted to be used in connection with the electrosurgical instrument $h$, (shown in Fig. 3,) and which, as described in my application hereinbefore referred to, comprises a cylindrical tube having an offset end $i$, in which an electric lamp 7 is fitted, and the other end is provided with a head 8, suitable electrical connections being made to and from the electric lamp to complete the circuit through the same. This hemispherical lens has a range of vision by its divergent angle of incidence that extends at both sides of a line at right angles to the axial line of the tubular part to such an extent that the power of the instrument is more than double that of the ordinary flat-surface prism heretofore employed.

I claim as my invention—

1. In an optical instrument, the combination with a tube having an opening therein, of a hemispherical lens set in said tube adjacent to the opening therein and in such a position that the angle between the flat face of the lens and the axial line of said tube is an angle of forty-five degrees, and a backing for the flat side of said hemispherical lens to cause the same to be reflective, substantially as specified.

2. The combination with a telescopic tube and the lenses therefor, of a metal end piece having an opening therein and being adapted to be secured to the said telescopic tube, a hemispherical lens set in said metal end piece, and a backing on the flat face of said lens to make the same reflective, substantially as specified.

3. In an optical instrument, the combination with a telescopic tube and lenses therefor, of a metal end piece having a V-shaped opening therein and adapted to be secured to said telescopic tube, a hemispherical lens set in said end piece adjacent to the opening therein in such a manner that the angle between the flat face of said lens and the axial line of the tube is an angle of forty-five degrees, a backing on the flat face of said hemispherical lens to render the same reflective, and a filling for the end of said metal end piece abutting against the flat side of said hemispherical lens and forming a foundation for the same, the joints between the said lens and the metal end piece being formed in such a manner as to be water-tight, substantially as specified.

4. The combination with a telescopic tube and the lenses therefor, of a metal end piece having an opening therein and being adapted to be secured to the said telescopic tube, a hemispherical lens set in said metal end piece, a backing on the flat face of said lens to make the same reflective, and means for sealing the lens in the end piece and thoroughly excluding moisture, substantially as specified.

Signed by me this 13th day of May, 1902.

REINHOLD H. WAPPLER.

Witnesses:
GEO. T. PINCKNEY,
S. T. HAVILAND.